US009008246B2

(12) United States Patent
Takahashi et al.

(10) Patent No.: US 9,008,246 B2
(45) Date of Patent: Apr. 14, 2015

(54) TRANSMISSION DEVICE, TRANSMISSION METHOD, RECEPTION DEVICE, RECEPTION METHOD, PROGRAM, AND COMMUNICATION SYSTEM (75) Inventors: Hiroo Takahashi, Tokyo (JP); Takahiro Okada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/003,669

(22) PCT Filed: Mar. 29, 2012

(86) PCT No.: PCT/JP2012/058377
§ 371 (c)(1),
(2), (4) Date: Sep. 6, 2013

(87) PCT Pub. No.: WO2012/137661
PCT Pub. Date: Oct. 11, 2012

(65) Prior Publication Data
US 2013/0347048 A1 Dec. 26, 2013

(30) Foreign Application Priority Data

Apr. 7, 2011 (JP) ................................. 2011-085334

(51) Int. Cl.
*H03D 1/04* (2006.01)
*H03K 5/01* (2006.01)
(Continued)

(52) U.S. Cl.
CPC ........... *H04N 21/6168* (2013.01); *H04H 20/12* (2013.01); *H04H 60/96* (2013.01);
(Continued)

(58) Field of Classification Search
CPC ................................ H04N 21/6168
USPC ................................. 725/126, 118
See application file for complete search history.

(56) References Cited

U.S. PATENT DOCUMENTS 5,512,958 A * 4/1996 Rzeszewski .................. 348/607

FOREIGN PATENT DOCUMENTS

JP 2009-296586 A 12/2009
WO WO-2008/093621 A1 8/2008

OTHER PUBLICATIONS

International Search Report; International Application No. PCT/JP2012/058377; Filed: Mar. 29, 2012; Mailing Date of the International Search Report: May 29, 2012 (Form PCT/ISA/210).

(Continued)

*Primary Examiner* — Jefferey Harold
*Assistant Examiner* — Omer Khalid
(74) *Attorney, Agent, or Firm* — Rader, Fishman & Grauer PLLC (57) ABSTRACT The present technique relates to a transmission device, a transmission method, a reception device, a reception method, a program, and a communication system which can realize a system capable of promptly addressing a newly-generated disturbance wave. A broadcasting device of the present disclosure includes: a reception unit which receives reception interference information notified from the reception device; a setting unit which sets a frequency of a notch to be provided in a transmission signal on the basis of the reception interference information that has been received; a modulation unit which provides the notch in accordance with the set frequency of the notch while at the same time generates a modulated signal by modulating information to be transmitted; and a send-out unit which sends out the modulated signal as the transmission signal. For example, the present disclosure can be applied to a broadcasting system which transmits a broadcasting signal conforming to DVB-C2 via a CATV network or a CATV Internet system (DOCSIS), a physical layer of which conforms to the DVB-C2 standard.

10 Claims, 9 Drawing Sheets (51) Int. Cl.

| | | |
|---|---|---|
| *H03K 6/04* | (2006.01) | |
| *H04B 1/10* | (2006.01) | |
| *H04L 1/00* | (2006.01) | |
| *H04L 25/08* | (2006.01) | |
| *H04N 21/61* | (2011.01) | |
| *H04H 20/12* | (2008.01) | |
| *H04H 60/96* | (2008.01) | |
| *H04L 12/28* | (2006.01) | |
| *H04N 21/2385* | (2011.01) | |
| *H04N 21/442* | (2011.01) | |
| *H04N 21/6377* | (2011.01) | |
| *H04H 20/78* | (2008.01) | |

(52) U.S. Cl.
CPC ........ *H04L12/2801* (2013.01); *H04N 21/2385* (2013.01); *H04N 21/44209* (2013.01); *H04N 21/6118* (2013.01); *H04N 21/6377* (2013.01); *H04H 20/78* (2013.01); *H04B 1/109* (2013.01)

(56) References Cited

OTHER PUBLICATIONS

DVB Document A138, "Digital Video Broadcasting (DVB), Frame structure channel coding and modulation for a second generation digital transmission system for cable systems (DVB-C2)," dated Jun. 2010.

Written Opinion of the International Searching Authority; International Application No. PCT/JP2012/058377; International Filing Date: Mar. 29, 2012; Dated: May 29, 2012. (Form PCT/ISA/220 and PCT/ISA/237).

\* cited by examiner

TRANSMISSION DEVICE, TRANSMISSION METHOD, RECEPTION DEVICE, RECEPTION METHOD, PROGRAM, AND COMMUNICATION SYSTEM

TECHNICAL FIELD

The present invention relates to a transmission device, a transmission method, a reception device, a reception method, a program, and a communication system, and particularly to a transmission device, a transmission method, a reception device, a reception method, a program, and a communication system adapted to provide a notch in a frequency band in which electromagnetic interference is generated, for example.

BACKGROUND ART

There is known a standard named DVB-C which was established in 1994 as a cable television broadcasting standard and is mainly adopted in Europe, while a standard named DVB-C2 has been proposed as a next-generation cable television broadcasting standard which replaces the DVB-C (refer to Non-Patent Document 1, for example).

The DVB-C2 is adapted to be able to provide a band (hereinafter referred to as a notch) in which a transmission signal is not transmitted even when the band is within a frequency band provided for CATV, so that a transmission signal of the CATV does not mutually interfere with a transmission signal used for a different purpose (such as radio communication provided for the police or radio communication provided for the military).

Now, an existing broadcasting system is adapted to investigate in advance a frequency band of a transmission signal that is used for a different purpose and can interfere with a transmission signal used for the CATV, and provide a notch corresponding to the frequency band.

CITATION LIST

Non-Patent Document

Non-Patent Document 1: DVB-C2 Specification [Digital Video Broadcasting (DVB); Frame structure channel coding and modulation for a second generation digital transmission system for cable systems (DVB-C2)] DVB Document A138.

SUMMARY OF THE INVENTION

Problems to be Solved by the Invention

As described above, the existing broadcasting system can address the known transmission signal that can interfere with the transmission signal used for the CATV. The system however cannot promptly address a situation when new transmission interfering with the transmission signal used for the CATV (hereinafter referred to as a disturbance wave) emerges in the future.

The present disclosure has been made in consideration of such situation and to be able to realize a system which can promptly address a newly-generated disturbance wave.

Solutions to Problems

A transmission device of a first aspect of the present disclosure includes: a reception unit which receives reception interference information notified from a reception device; a setting unit which sets a frequency of a notch to be provided in a transmission signal on the basis of the reception interference information received; a modulation unit which provides the notch in accordance with the set frequency of the notch while at the same time generates a modulated signal by modulating information to be transmitted; and a send-out unit which sends out the modulated signal as the transmission signal.

The reception interference information includes at least a frequency of a disturbance wave, and the setting means can set the frequency of the disturbance wave included in the reception interference information which has been received as the frequency of the notch to be provided in the transmission signal.

The transmission device of the first aspect of the present disclosure can further include a command generation unit which specifies the reception device to be a transmission target and generates a command which requests notification of the reception interference information, in which the reception unit can receive the reception interference information notified from the reception device in response to the command.

A transmission method of the first aspect of the present disclosure, in a transmission method by a transmission device, includes: a reception step of receiving reception interference information notified from a reception device; a setting step of setting a frequency of a notch to be provided in the transmission signal on the basis of the reception interference information received; a modulation step of providing the notch in accordance with the set frequency of the notch while at the same time generating a modulated signal by modulating information to be transmitted; and a send-out step of sending out the modulated signal as the transmission signal.

A program of the first aspect of the present disclosure is a program for controlling a transmission device, the program allowing a computer of the transmission device to perform a process including: a reception step of receiving reception interference information notified from a reception device; a setting step of setting a frequency of a notch to be provided in the transmission signal on the basis of the reception interference information received; a modulation step of providing the notch in accordance with the set frequency of the notch while at the same time generating a modulated signal by modulating information to be transmitted; and a send-out step of sending out the modulated signal as the transmission signal.

In the first aspect of the present disclosure, the reception interference information notified from the reception device is received, the frequency of the notch to be provided in the transmission signal is set on the basis of the reception interference information received, and the transmission signal is sent out while the notch is provided in accordance with the set frequency.

A reception device of a second aspect of the present disclosure includes: a reception unit which receives a transmission signal; a detection unit which detects a disturbance wave generated in the transmission signal; holding means which holds reception interference information representing detection result of the disturbance wave; and a notification unit which notifies a transmission device transmitting the transmission signal of the reception interference information being held.

The notification means can notify the transmission device of the reception interference information being held in response to a command from the transmission device.

The holding means can exclude the detection result of the detected disturbance wave from the reception interference information when a notch addressing the detected disturbance wave is provided in the transmission signal.

A reception method of the second aspect of the present disclosure, in a reception method by a reception device, includes: a reception step of receiving a transmission signal; a detection step of detecting a disturbance wave generated in the transmission signal; a holding step of holding reception interference information representing detection result of the disturbance wave; and a notification step of notifying a transmission device which transmits the transmission signal of the reception interference information being held.

A program of the second aspect of the present disclosure is a program for controlling a reception device, the program allowing a computer of the reception device to perform a process including: a reception step of receiving a transmission signal; a detection step of detecting a disturbance wave generated in the transmission signal; a holding step of holding reception interference information representing detection result of the disturbance wave; and a notification step of notifying a transmission device which transmits the transmission signal of the reception interference information being held.

In the second aspect of the present disclosure, the disturbance wave being generated in the transmission signal is detected, the reception interference information representing the detection result of the disturbance wave is held, and the reception interference information being held is notified to the transmission device which transmits the transmission signal.

A communication system of a third aspect of the present disclosure is a communication system including a transmission device which transmits a transmission signal and a reception device which receives the transmission signal being transmitted, in which the transmission device includes: a reception unit which receives reception interference information notified from the reception device; a setting unit which sets a frequency of a notch to be provided in the transmission signal on the basis of the reception interference information received; a modulation unit which provides the notch in accordance with the set frequency of the notch while at the same time generates a modulated signal by modulating information to be transmitted; and a send-out unit which sends out the modulated signal as the transmission signal, and the reception device includes: a reception unit which receives the transmission signal being transmitted; a detection unit which detects a disturbance wave generated in the transmission signal; holding means which holds reception interference information representing detection result of the disturbance wave; and a notification unit which notifies the transmission device of the reception interference information being held.

In the third aspect of the present disclosure, the transmission device receives the reception interference information notified from the reception device, sets the frequency of the notch to be provided in the transmission signal on the basis of the reception interference information received, and sends out the transmission signal while providing the notch in accordance with the set frequency. Moreover, the reception device detects the disturbance wave being generated in the transmission signal, holds the reception interference information representing the detection result of the disturbance wave, and notifies the transmission device of the reception interference information being held.

Effects of the Invention

According to the first aspect of the present disclosure, the notch can be provided in the transmission signal in response to the disturbance wave notified from the reception device.

According to the second aspect of the present disclosure, the disturbance wave can be detected and notified to the transmission side.

According to the third aspect of the present disclosure, there can be realized the system which can promptly address the newly-generated reception interference.

MODES FOR CARRYING OUT THE INVENTION

Figure 7:
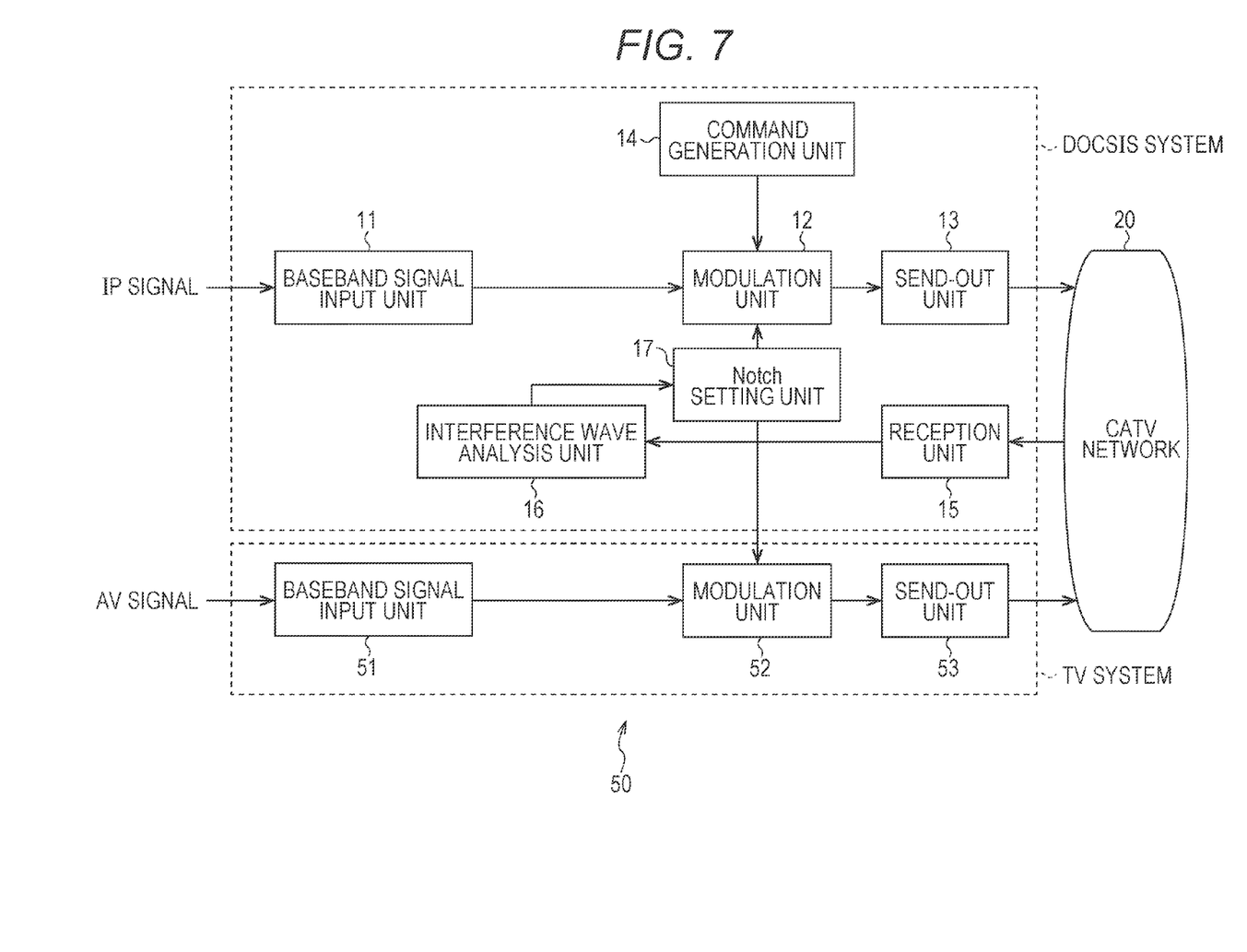
FIG. 7 is a block diagram illustrating a second configuration example of the transmission device being an embodiment.

Best modes for carrying out the present disclosure (hereinafter referred to as an embodiment) will now be described. A broadcasting system as an embodiment of the present disclosure includes a transmission device provided in a CATV broadcasting station or the like (a transmission device 10 in FIG. 3 and a transmission device 50 in FIG. 7) and a reception device provided in a residence of each customer (a reception device 30 in FIG. 4 and a reception device 60 in FIG. 8). An overview of an operation of the broadcasting system will be described first.

Figure 1:
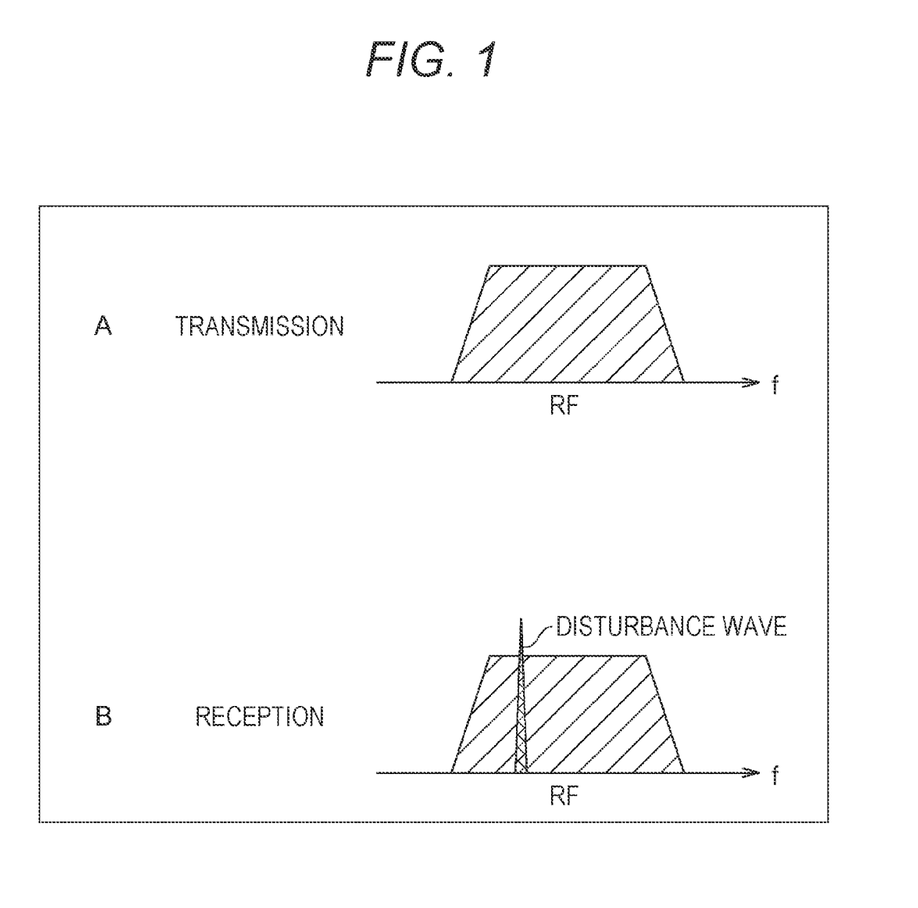
FIG. 1 is a diagram illustrating the generation of a disturbance wave.
Figure 2:
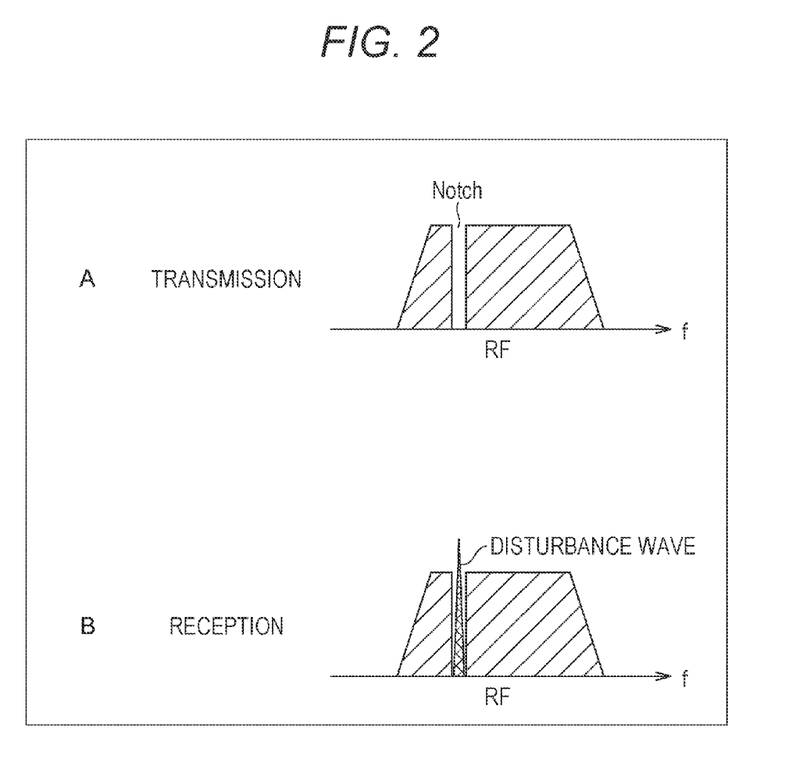
FIG. 2 is a diagram illustrating a state where a notch is provided in response to the disturbance wave generated.

FIG. 1 illustrates a state of a transmission signal being transmitted and the transmission signal being received before the broadcasting system addresses a disturbance wave, whereas FIG. 2 illustrates a state of the transmission signal being transmitted and the transmission signal being received after the broadcasting system has addressed the disturbance wave.

Let us assume that a transmission signal without any kind of interference is transmitted via a CATV network as illustrated in a case A in FIG. 1 but that the transmission signal is received with a disturbance wave as illustrated in a case B in FIG. 1. The presence of the disturbance wave is notified from a reception side to a transmission side.

Subsequently, a transmission signal provided with a notch in alignment with a frequency band of the disturbance wave is transmitted as illustrated in a case A in FIG. 2 when it has turned out that the disturbance wave is generated over a wide area of a certain extent. The disturbance wave is still present in the transmission signal as illustrated in a case B in FIG. 2 even after the reception side has received the transmission signal provided with the notch. The reception side can however receive the transmission signal without experiencing substantial reception interference because information which receives interference by the disturbance wave is nonexistent when the notch not transmitting the information is provided.

1. Embodiments

[First Configuration Example of Transmission Device (Configuration Example Including Only DOCSIS System)]

Figure 3:
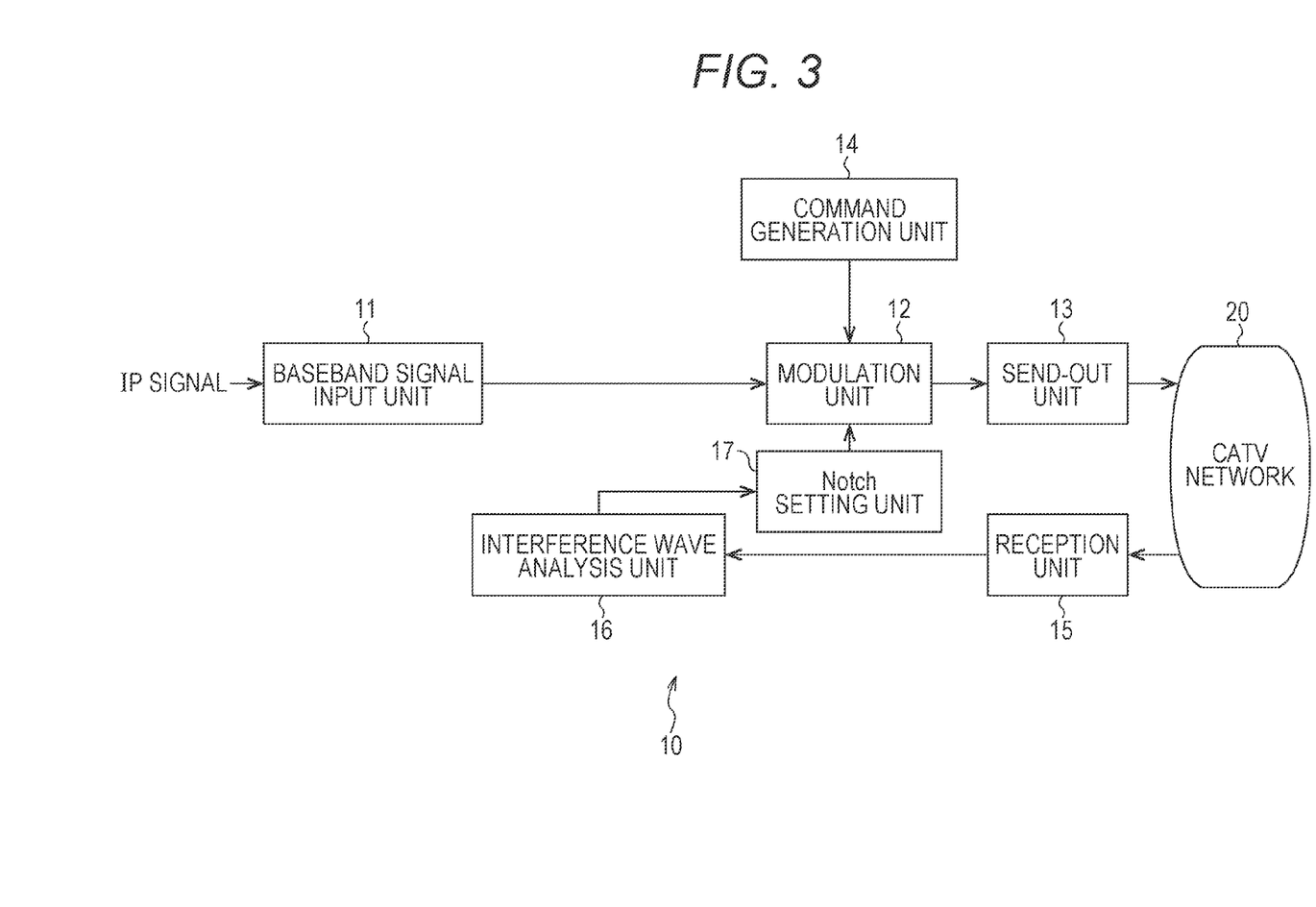
FIG. 3 is a block diagram illustrating a first configuration example of a transmission device being an embodiment.

FIG. 3 illustrates a first configuration example of a transmission device being an embodiment. A transmission device 10 is installed at a CATV broadcasting station or the like and transmits, via a CATV network 20, a broadcasting signal or DOCSIS data conforming to DVB-C2 in accordance with an operation by an operator.

The transmission device 10 includes a baseband signal input unit 11, a modulation unit 12, a send-out unit 13, a command generation unit 14, a reception unit 15, an interference wave analysis unit 16, and a notch setting unit 17.

The baseband signal input unit 11 inputs a baseband signal to the modulation unit 12, the baseband signal corresponding to an encoded signal in which content (such as an IP (Internet Protocol) signal) is encoded. When the position (frequency) of a notch is specified by the notch setting unit 17, the modulation unit 12 provides the notch at the specified position while at the same time modulates the baseband signal input from the baseband signal input unit 11 and a reception interference information notification command input from the command generation unit 14 by a predetermined modulation scheme (such as 4K OFDM or 4096 QAM) specified in the DVB-C2, and outputs a resultant modulated signal to the send-out unit 13.

The send-out unit 13 sends out the modulated signal, which has been input from the modulation unit 12, to the CATV network 20 as a transmission signal.

According to an operation by the operator, the command generation unit 14 generates the reception interference information notification command specifying an IP address of a reception device 30 to be a target receiver and outputs the command to the modulation unit 12. Here, a plurality of reception devices 30 can be simultaneously specified as the target receiver by using the IP address.

The reception unit 15 receives reception interference information as DOCSIS (Data Over Cable Service Interface Specifications) data and outputs it to the interference wave analysis unit 16, the reception interference information being notified from the plurality of reception devices 30 via the CATV network 20 in response to the reception interference information notification command that has been transmitted. Note that the reception interference information communicated is not limited to the DOCSIS.

On the basis of the reception interference information notified from the plurality of reception devices 30, the interference wave analysis unit 16 analyzes a scale of the reception interference caused by a disturbance wave and presents it to the operator. The interference wave analysis unit 16 also notifies the notch setting unit 17 of a frequency of an interference wave in accordance with an operation by the operator.

The notch setting unit 17 specifies the position of the notch (a frequency identical to the frequency of the interference wave notified by the interference wave analysis unit 16) to the modulation unit 12.

[First Configuration Example of Reception Device (Configuration Example Including Only DOCSIS System)]

Figure 4:
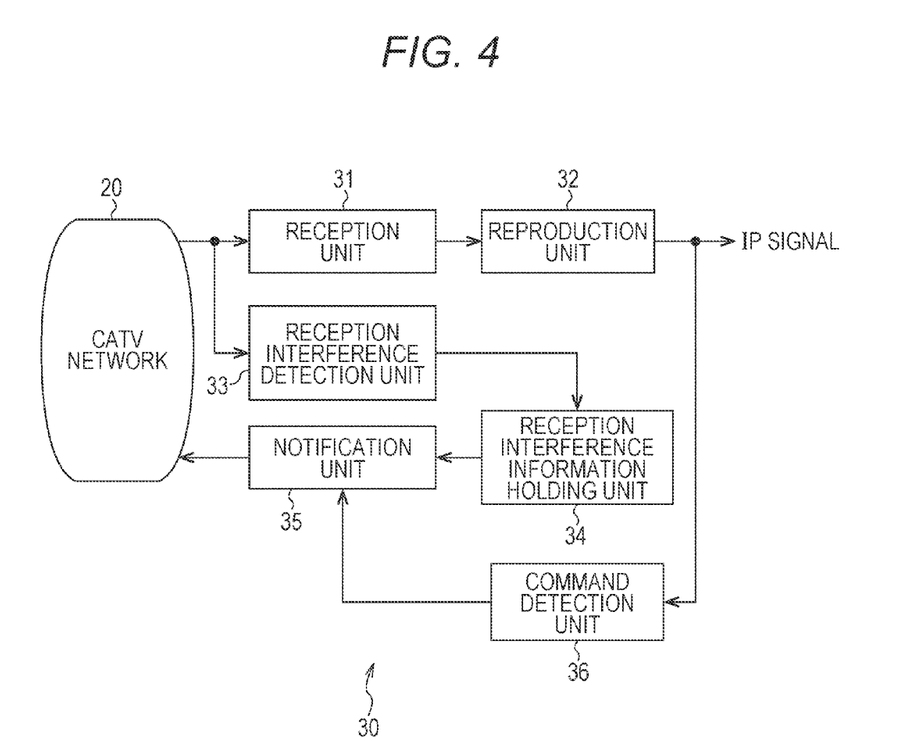
FIG. 4 is a block diagram illustrating a first configuration example of a reception device being an embodiment.

FIG. 4 illustrates a first configuration example of a reception device being an embodiment. The reception device 30 is installed in a residence of each user who uses CATV, for example, and receives/demodulates a broadcasting signal conforming to the DVB-C2 via the CATV network 20 in order to reproduce content of a television program or connect to the Internet. Note that each reception device 30 is given an IP address in the CATV network 20, where the IP address along with a user's address (namely, an installation site of the reception device 30) or the like as user information are managed by a broadcasting side of the CATV.

The reception device 30 includes a reception unit 31, a reproduction unit 32, a reception interference detection unit 33, a reception interference information holding unit 34, and a notification unit 35.

The reception unit 31 extracts a predetermined frequency component from the transmission signal transmitted via the CATV network 20 and outputs the frequency component to the reproduction unit 32. The reproduction unit 32 demodulates/decodes the frequency component input from the reception unit 31 and outputs a resultant IP signal to a following stage.

The reception interference detection unit 33 detects whether or not reception interference is generated in the transmission signal transmitted via the CATV network 20, or detects the disturbance wave in the transmission signal, and outputs as the detection result the position (frequency) and intensity of the disturbance wave to the reception interference information holding unit 34. Note that a method of detecting the disturbance wave is selected at will. The invention described in Japanese Laid-Open Patent Application No. 2007-202082 can be applied to CW (Continuous Wave) disturbance, for example. Moreover, the reception interference detection unit 33 may be built in the reception unit 31.

The reception interference information holding unit 34 holds the detection result of the disturbance wave input from the reception interference detection unit 33 as the reception interference information. However, the detection result of the disturbance wave is excluded from the reception interference information when a notch addressing the detected disturbance wave has already been provided in the transmission signal of the CATV. The notification unit 35 reads the reception interference information held in the reception interference information holding unit 34 in response to the reception interference information notification command input from the command detection unit 36, and notifies the transmission device 10 of the information as the DOCSIS data via the CATV network 20. The command detection unit 36 detects, from the IP signal output from the reproduction unit 32, the transmitted reception interference information notification command specifying the IP address of the reception device 30 and outputs the command to the notification unit 35.

[Description of Operation]

Next, an operation of a broadcasting system that is an embodiment of the present disclosure will be described.

Figure 5:
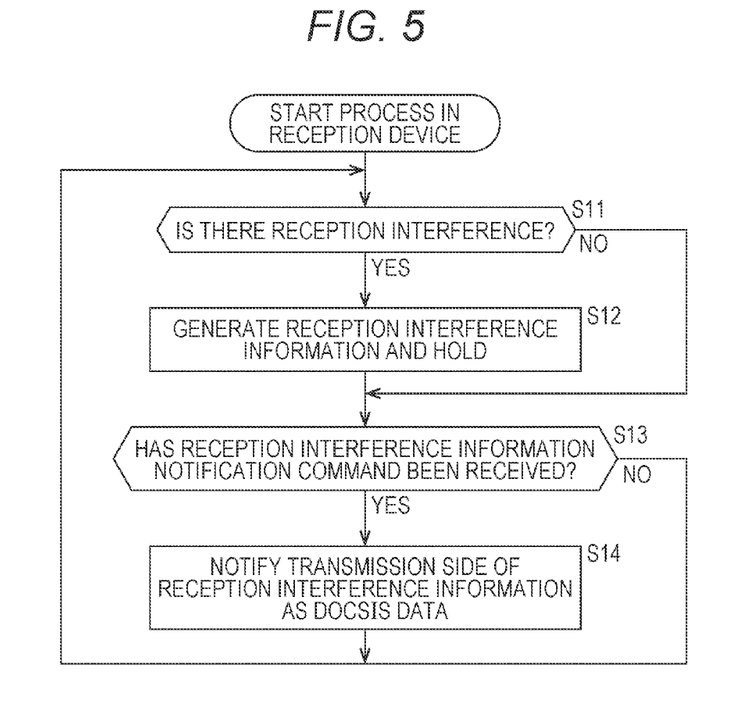
FIG. 5 is a flowchart illustrating a process performed in the reception device.

FIG. 5 is a flowchart illustrating a process in the reception device 30. This process in the reception device 30 is performed in parallel with a regular reception process of extracting from the transmission signal a frequency component corresponding to the channel selection made by a user and demodulating/decoding the frequency component.

In step S11, the reception interference detection unit 33 determines whether or not the reception interference is generated in the transmission signal transmitted via the CATV network 20 and stands by until having determined that the reception interference is generated. The process proceeds to step S12 when it is determined that the reception interference is generated.

In step S12, the reception interference detection unit 33 outputs the position (frequency) and the intensity of the disturbance wave causing the reception interference to the reception interference information holding unit 34. The reception interference information holding unit 34 holds the detection result of the disturbance wave input from the reception interference detection unit 33 as the reception interference information.

In step S13, the command detection unit 36 determines, from the IP signal based on the transmission signal that is transmitted via the CATV network 20, whether or not the reception interference information notification command transmitted while specifying the IP address of the reception device 30 is present. When it is determined that the reception interference information notification command is not present, the process returns to step S11 where the following step is repeated.

The process proceeds to step S14 when it is determined in step S13 that the reception interference information notification command transmitted while specifying the IP address of the reception device 30 is present.

In step S14, the command detection unit 36 outputs to the notification unit 35 the reception interference information notification command transmitted while specifying the IP address of the reception device 30. In response to the reception interference information notification command having been input, the notification unit 35 reads the reception interference information held in the reception interference information holding unit 34 and notifies the transmission device 10 of the information as the DOCSIS data via the CATV network 20. Subsequently, the process returns to step S11 where the following step is repeated. The process in the reception device 30 is now complete.

While the aforementioned process in the reception device 30 is adapted to passively transmit the reception interference information being held to the transmission side in response to the reception interference information notification command from the transmission side, the reception device 30 may actively transmit the reception interference information to the transmission side in response to the detection of the reception interference as well.

There is also a case where a user of the reception device 30 contacts a customer center of the CATV about the reception interference generated when the user himself has recognized the reception interference in a television program.

Figure 6:
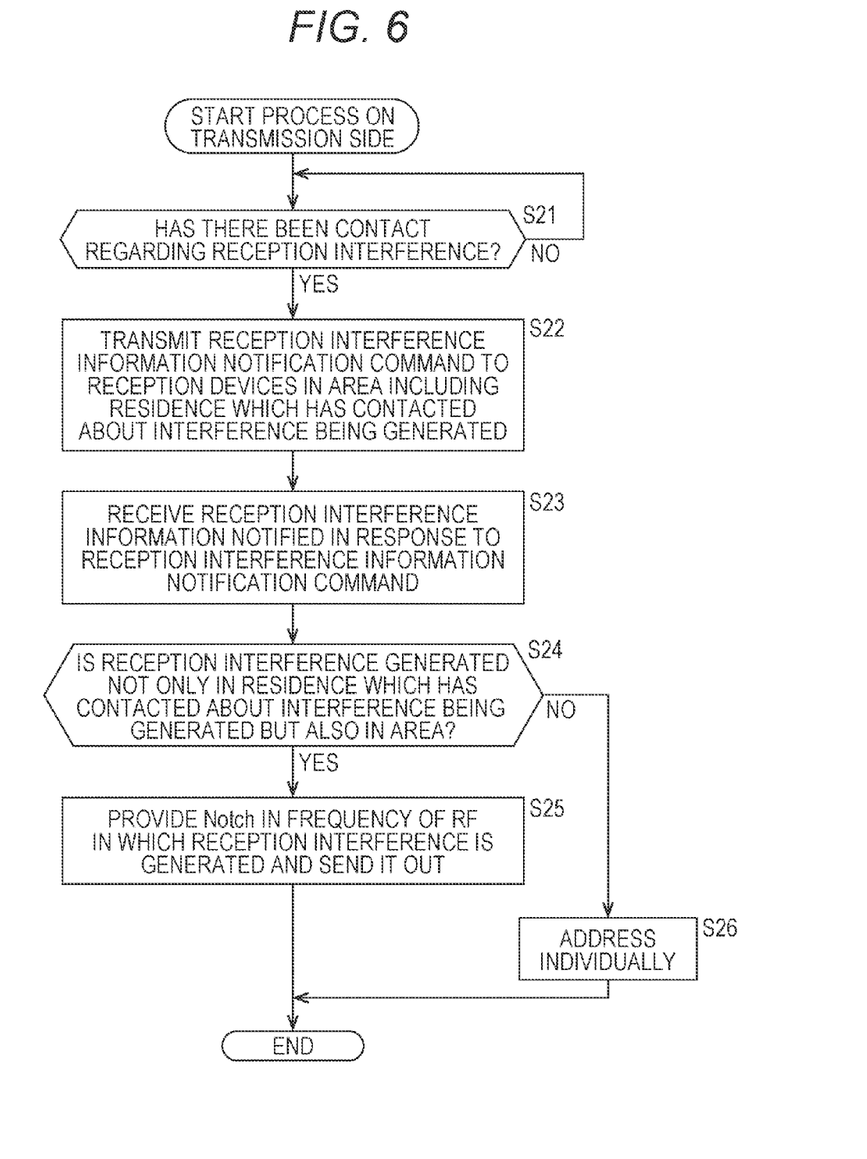
FIG. 6 is a flowchart illustrating a process performed on a transmission side.

Now, FIG. 6 is a flowchart illustrating a process on the transmission side including an operation of the transmission device 10.

In step S21, the transmission side (such as the customer center of the CATV) stands by until the user of the reception device 30 has contacted about the reception interference being generated. The process proceeds to step S22 when the user has contacted about the reception interference being generated.

In step S22, the command generation unit 14 generates the reception interference information notification command with the target receiver thereof being the reception device 30 installed in a predetermined area including the residence of the user who has contacted about the reception interference being generated. The generated reception interference information notification command is sent out to the CATV network 20 through the modulation unit 12 and the send-out unit 13.

In step S23, the reception unit 15 receives, via the CATV network 20, the reception interference information notified from the plurality of reception devices 30 as the DOCSIS data in response to the reception interference information notification command and outputs the information to the interference wave analysis unit 16. In step S24, the interference wave analysis unit 16 analyzes, on the basis of the reception interference information notified from the reception device, the scale of the reception interference caused by the disturbance wave and presents it to the operator. On the basis of the presentation, the operator determines whether or not the reception interference is generated in the predetermined area including the residence of the user who has contacted about the reception interference being generated. The process proceeds to step S25 when the operator has determined that the interference is generated in the area.

In step S25, the interference wave analysis unit 16 notifies the notch setting unit 17 of the frequency of the interference wave in accordance with the operation from the operator. In response to the notification, the notch setting unit 17 specifies the position of the notch (the frequency identical to the frequency of the interference wave notified from the interference wave analysis unit 16) to the modulation unit 12. As a result, the notch is provided in the transmission signal of the CATV and is sent out. The band in which information can be transmitted decreases by providing the notch, thereby possibly requiring reduction in the amount of information transmitted by degrading image quality of a television program depending on the circumstances.

When the operator has determined in step S24 that the reception interference is generated not in the area but only in the residence of the user who has contacted or only in his neighborhood, the process proceeds to step S26. No notch is set in this case. In step S26, the operator individually addresses the issue with the residence of the user who has contacted and the like. The description of the process on the transmission side is now complete.

As described above, the broadcasting system being the embodiment of the present disclosure can also address an unknown interference wave that can be generated in the future. The reception device 30 can therefore demodulate and decode the transmission signal of the CATV without being affected by the reception interference.

Moreover, the broadcasting station of the CATV can temporarily address the issue by acquiring the reception state in the area without visiting the residence of the user who has notified of the reception interference being generated.

Furthermore, the broadcasting station of the CATV can monitor the reception state in the area and utilize it in the operation and maintenance of the network by transmitting the reception interference information notification command without waiting for the notification of the reception interference being generated from the user.

Note that the transmission device and the reception device which configure the broadcasting system being the embodiment of the present disclosure can also adopt the following configuration example.

[Second Configuration Example of Transmission Device (Configuration Example Including DOCSIS System and TV System)]

Figure 8:
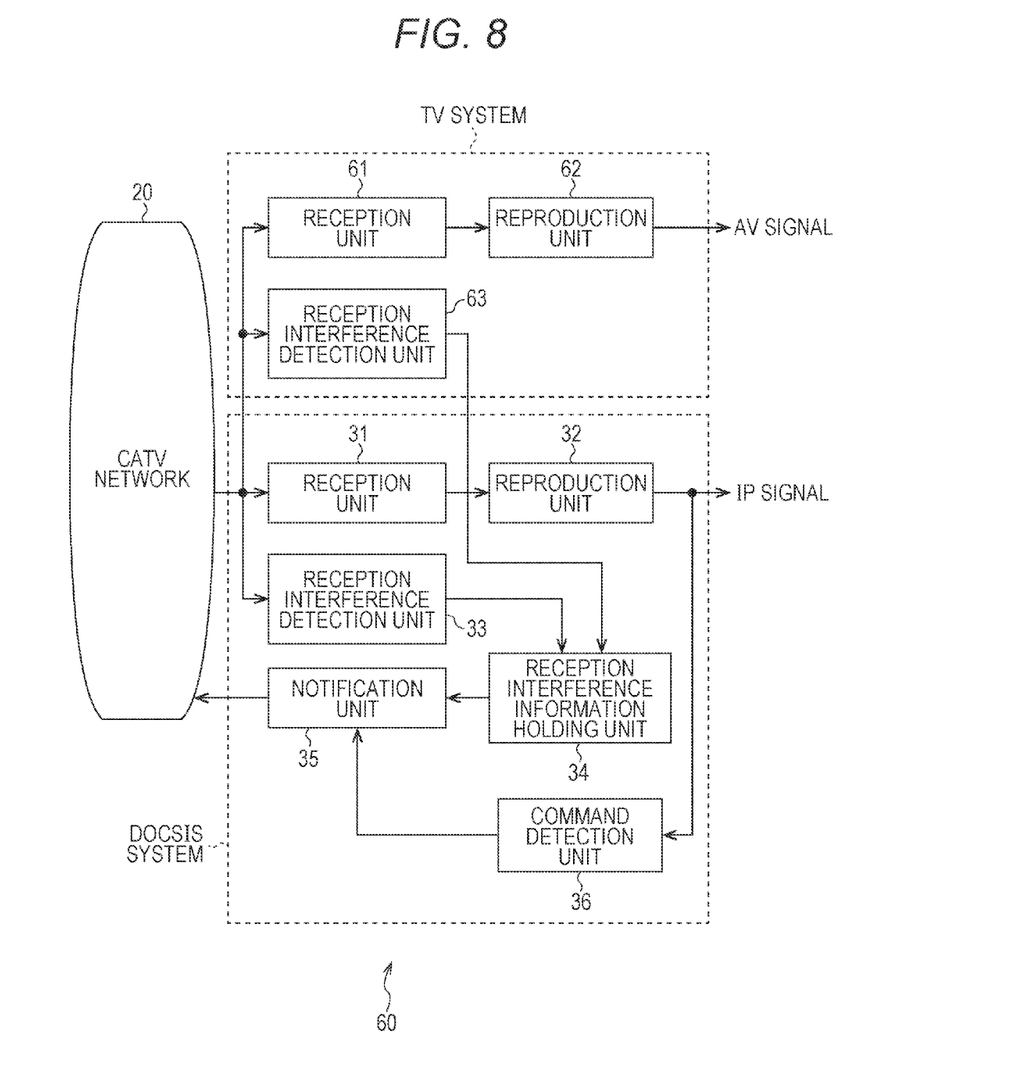
FIG. 8 is a block diagram illustrating a second configuration example of the reception device being an embodiment.

Now, FIG. 8 illustrates a second configuration example of a transmission device. A transmission device 50 is configured by adding a TV system which transmits an AV signal used in TV broadcasting or the like to the transmission device 10 described as the first configuration example illustrated in FIG. 3. Here, the description of a component common to the transmission device 10 will be omitted by assigning to the component the same reference numeral as that in FIG. 3.

The TV system includes a baseband signal input unit 51, a modulation unit 52, and a send-out unit 53. The baseband signal input unit 51 inputs a baseband signal to the modulation unit 52, the baseband signal corresponding to an encoded signal in which content (an AV signal of a television program or the like) is encoded. When the position (frequency) of a notch is specified by a notch setting unit 17, the modulation unit 52 provides the notch at the specified position while at the same time modulates the baseband signal input from the baseband signal input unit 51 by a predetermined modulation scheme (such as 4K OFDM or 4096 QAM) specified in the DVB-C2, and outputs a resultant modulated signal to the send-out unit 53. The send-out unit 53 sends out the modulated signal, which has been input from the modulation unit 52, to a CATV network 20 as a transmission signal.

Note that a command generation unit 14 in the transmission device 50 being the second configuration example can generate a reception interference information notification command while specifying at least one of a TV broadcasting channel and a DOCSIS channel.

Moreover, the notch setting unit 17 in the transmission device 50 being the second configuration example specifies the position of the notch (a frequency identical to the frequency of an interference wave notified from an interference wave analysis unit 16) to the modulation unit 52 when the frequency of the interference wave is in the TV broadcasting channel or to a modulation unit 12 when in the transmission frequency band of the DOCSIS data channel.

[Second Configuration Example of Reception Device (Configuration Example Including DOCSIS System and TV System)]

FIG. 8 illustrates a second configuration example of a reception device being an embodiment. A reception device 60 is configured by adding a TV system which receives an AV signal used in TV broadcasting or the like to the reception device 30 described as the first configuration example illustrated in FIG. 4. Here, the description of a component common to the reception device 30 will be omitted by assigning to the component the same reference numeral as that in FIG. 4.

The TV system includes a reception unit 61, a reproduction unit 62, and a reception interference detection unit 63. The reception unit 61 extracts a frequency component corresponding to the channel selection made by a user from a transmission signal transmitted via a CATV network 20 and outputs the frequency component to the reproduction unit 62. The reproduction unit 62 demodulates/decodes the frequency component corresponding to the channel selection by the user and being input from the reception unit 61, and outputs a resultant AV signal to a following stage. The reception interference detection unit 63 determines whether or not reception interference is generated in the transmission signal in a TV broadcasting channel transmitted via the CATV network 20, or detects a disturbance wave in the transmission signal in the TV broadcasting channel, and outputs as the detection result the position (frequency) and intensity of the disturbance wave to a reception interference information holding unit 34. Note that the reception interference detection unit 63 may be built in the reception unit 61.

A reception interference detection unit 33 in the reception device 60 being the second configuration example detects whether or not reception interference is generated in the transmission signal in a DOCSIS data channel transmitted via the CATV network 20, or detects a disturbance wave in the transmission signal in the DOCSIS data channel, and outputs as the detection result the position (frequency) and intensity of the disturbance wave to the reception interference information holding unit 34.

Moreover, a command detection unit 36 in the reception device 60 being the second configuration example detects, from the transmission signal transmitted via the CATV network 20, a reception interference information notification command transmitted while specifying an IP address of the reception device 60 and outputs to a notification unit 35 reception interference information in at least one of the TV broadcasting channel and the DOCSIS data channel, in response to the detected command.

The description of the operation of the transmission device 50 and the reception device 60 being the second configuration example will be omitted since it is similar to the operation of the transmission device 10 and the reception device 30 being the first configuration example.

Note that the communication system in the present disclosure can be applied not only to the broadcasting system that is the embodiment which transmits the broadcasting signal conforming to the DVB-C2 via the CATV network but also to a CATV internet system (DOCSIS), a physical layer of which conforms to the DVB-C2 standard.

The aforementioned series of processes can be performed by hardware or software. When the series of processes is performed by the software, a program configuring the software is installed from a program recording medium to a computer incorporated into dedicated hardware or, for example, a general-purpose personal computer capable of performing various functions by installing various programs.

Figure 9:
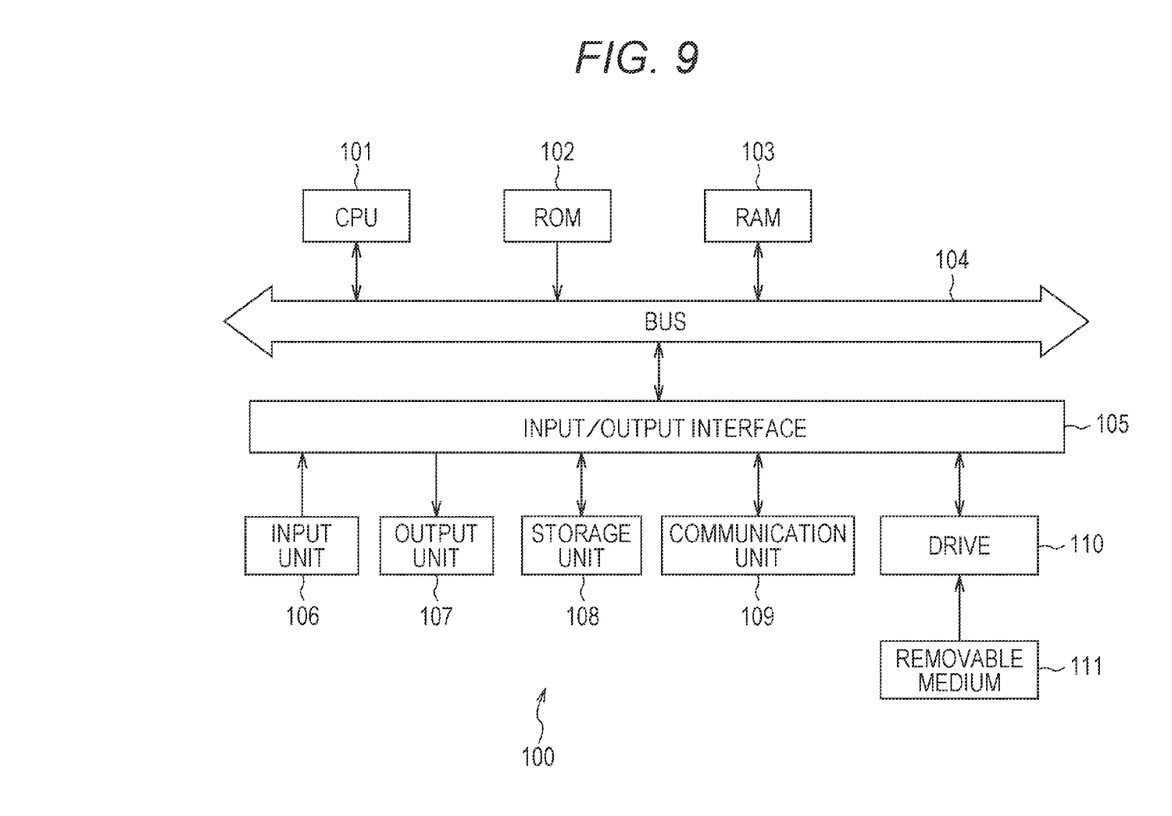
FIG. 9 is a block diagram illustrating a configuration example of a computer.

FIG. 9 is a block diagram illustrating a configuration example of hardware of a computer which performs the aforementioned series of processes by a program.

In a computer 100, a CPU (Central Processing Unit) 101, a ROM (Read Only Memory) 102, and a RAM (Random Access Memory) 103 are connected to one another by a bus 104.

An input/output interface 105 is also connected to the bus 104. Connected to the input/output interface 105 are an input unit 106 including a keyboard, a mouse, a microphone and the like, an output unit 107 including a display, a speaker and the like, a storage unit 108 including a hard disk, a nonvolatile memory and the like, a communication unit 109 including a network interface and the like, and a drive 110 which drives a removable medium 111 such as a magnetic disk, an optical disk, a magneto-optic disk, or a semiconductor memory.

The aforementioned series of processes is performed in the computer 100 configured in the aforementioned manner where the CPU 101 loads a program stored in the storage unit 108 to the RAM 103 via the input/output interface 105 and the bus 104 and executes the program, for example.

Note that the program executed by the computer may be a program performing a process in time series along the order described herein, or a program performing a process in parallel or at a required timing when called, for example.

Moreover, the program may be processed by a single computer or processed in a distributed manner by a plurality of computers. The program may also be transferred to a remote computer and executed thereby.

The embodiments of the present invention are not to be limited to the aforementioned embodiments, where various modifications can be made without departing from the spirit of the present invention.

REFERENCE SIGNS LIST

10 transmission device, 11 baseband signal input unit, 12 modulation unit, 13 send-out unit, 14 command generation unit, 15 reception unit, 16 interference wave analysis unit, 17 notch setting unit, 20 CATV network, 30 reception device, 31 reception unit, 32 reproduction unit, 33 reception interference detection unit, 34 reception interference information holding unit, 35 notification unit, 50 transmission unit, 51 baseband signal input unit, 52 modulation unit, 53 reception unit, 60 reception device, 61 reception unit, 62 reproduction unit, 63 reception interference detection unit, 100 computer, 101 CPU

The invention claimed is:

1. A transmission device comprising:
   a reception unit configured to receive reception interference information from a reception device;
   an interference wave analysis unit which receives the reception interference information from the reception unit and analyzes a scale of disturbance to the reception interference information;
   a setting unit which receives a frequency of an interference wave from the interference wave analysis unit and sets a frequency of a notch to be provided in a transmission signal as the frequency of the interference wave;
   a modulation unit which receives the frequency of the notch in the transmission signal from the setting unit, provides the notch and simultaneously generates a modulated signal by modulating information to be transmitted; and
   a send-out unit which receives the modulated signal from the modulation unit and sends out the modulated signal as the transmission signal.

2. The transmission device according to claim 1, further comprising a command generation unit which specifies the reception device to be a transmission target and generates a command which requests notification of the reception interference information, wherein the reception unit receives the reception interference information notified from the reception device in response to the command.

3. A transmission method by a transmission device, the transmission device performing the transmission method comprising:
   a reception step of receiving reception interference information from a reception device;
   an analysis step of receiving the reception interference information from the reception unit and analyzes, in an interference wave analysis unit, a scale of disturbance to the reception interference information;
   a setting step of receiving the reception interference information from the interference wave analysis unit and setting a frequency of a notch to be provided in the transmission signal;
   a modulation step of receiving the frequency of the notch in the transmission signal from the setting unit and providing the notch while simultaneously generating a modulated signal by modulating information to be transmitted; and
   a send-out step of receiving the modulated signal from the modulation unit and sending out the modulated signal as the transmission signal.

4. A non-transitory computer readable medium storing program code for controlling a transmission device being executed by a processor to perform operations comprising:
   a reception step of receiving reception interference information from a reception device;
   an analysis step of receiving the reception interference information from the reception unit and analyzes, in an interference wave analysis unit, a scale of disturbance to the reception interference information;
   a setting step of receiving the reception interference information from the interference wave analysis unit and setting a frequency of a notch to be provided in the transmission signal;
   a modulation step of receiving the frequency of the notch in the transmission signal from the setting unit and providing the notch while simultaneously generating a modulated signal by modulating information to be transmitted; and
   a send-out step of receiving the modulated signal from the modulation unit and sending out the modulated signal as the transmission signal.

5. A reception device comprising:
   a reception unit which receives a transmission signal;
   a detection unit which receives the transmission signal and detects a disturbance wave generated in the transmission signal;
   a holding unit which holds reception interference information representing detection result of the disturbance wave; and
   a notification unit which notifies a transmission device transmitting the transmission signal of the reception interference information being held, wherein
   the reception interference information is analyzed for a scale of interference and wherein a notch is then provided in the transmission signal from the transmission device at a frequency of the interference wave and a modulated signal is generated.

6. The transmission device according to claim 5, wherein the notification means notifies the transmission device of the reception interference information being held in response to a command from the transmission device.

7. The transmission device according to claim 6, wherein the holding means excludes the detection result of the detected disturbance wave from the reception interference information when a notch addressing the detected disturbance wave is provided in the transmission signal.

8. A reception method by a reception device, the reception device performing the reception method comprising:
   a reception step configured to receives a transmission signal;
   a detection step of receiving the transmission signal and detects whether a disturbance wave is generated in the transmission signal;
   a holding step of holding reception interference information representing detection result of the disturbance wave;
   a detection step of receiving the transmission signal from the reception unit and detecting the transmitted reception interference information notification command, when reception interference is not detected; and
   a notification step of notifying a transmission device transmitting the transmission signal of the reception interference information being held, wherein
   the reception interference information is analyzed for a scale of interference and wherein a notch is then provided in the transmission signal from the transmission device at a frequency of the interference wave and a modulated signal is generated.

9. A non-transitory computer readable medium program code for controlling a reception device being executable by a processor to perform operations comprising:
   a reception step of receives a transmission signal;
   a detection step of receiving the transmission signal and detects whether a disturbance wave is generated in the transmission signal;
   a holding step of holding reception interference information representing detection result of the disturbance wave;
   a detection step of receiving the transmission signal from the reception unit and detecting the transmitted reception interference information notification command, when reception interference is not detected; and
   a notification step of notifying a transmission device transmitting the transmission signal of the reception interference information being held, wherein the reception interference information is analyzed for a scale of interference and wherein a notch is then provided in the transmission signal from the transmission device at a frequency of the interference wave and a modulated signal is generated.

10. A communication system comprising a transmission device which transmits a transmission signal and a reception device which receives the transmission signal being transmitted, wherein the transmission device includes:
- a reception unit which receives reception interference information from a reception device;
- an interference wave analysis unit which receives the reception interference information from the reception unit and analyzes a scale of disturbance to the reception interference information;
- a setting unit which receives a frequency of an interference wave from the interference wave analysis unit and sets a frequency of a notch to be provided in a transmission signal as the frequency of the interference wave;
- a modulation unit which receives the frequency of the notch in the transmission signal from the setting unit, provides the notch and simultaneously generates a modulated signal by modulating information to be transmitted; and
- a send-out unit which receives the modulated signal from the modulation unit and sends out the modulated signal as the transmission signal; and the reception device includes:
- a reception unit which receives a transmission signal;
- a detection unit which receives the transmission signal and detects whether a disturbance wave is generated in the transmission signal;
- a holding unit which holds reception interference information representing detection result of the disturbance wave, including position, frequency and intensity of the disturbance wave;
- a notification unit which notifies a transmission device transmitting the transmission signal of the reception interference information being held.

* * * * *